United States Patent
Marshall (10) Patent No.: US 11,897,067 B2
(45) Date of Patent: Feb. 13, 2024

(54) MEASUREMENT DEVICE FOR A MACHINE TOOL

(71) Applicant: RENISHAW PLC, Wotton-under-Edge (GB)

(72) Inventor: Derek Marshall, Hawkesbury Upton (GB)

(73) Assignee: RENISHAW PLC, Wotton-under-Edge (GB)

( * ) Notice: Subject to any disclaimer, the term of this patent is extended or adjusted under 35 U.S.C. 154(b) by 347 days.

(21) Appl. No.: 17/420,211

(22) PCT Filed: Jan. 24, 2020

(86) PCT No.: PCT/GB2020/050165
§ 371 (c)(1),
(2) Date: Jul. 1, 2021

(87) PCT Pub. No.: WO2020/152476
PCT Pub. Date: Jul. 30, 2020

(65) Prior Publication Data
US 2022/0063041 A1    Mar. 3, 2022

(30) Foreign Application Priority Data
Jan. 25, 2019  (EP) .................................... 19153749

(51) Int. Cl.
*B23Q 17/09*       (2006.01)
(52) U.S. Cl.
CPC .................... *B23Q 17/09* (2013.01)

(58) Field of Classification Search
CPC .... B23Q 17/09; B23Q 17/24; B23Q 17/2457; B23Q 17/2461
(Continued)

(56) References Cited

U.S. PATENT DOCUMENTS 4,779,319 A * 10/1988 Juengel .................. G01B 7/003
29/57
5,857,812 A    1/1999 Stahl
(Continued)

FOREIGN PATENT DOCUMENTS

| CN | 205750492 U | 11/2016 |
| DE | 4431845 A1 | 3/1996 |

(Continued)

OTHER PUBLICATIONS

Jul. 29, 2019 Search Report issued in European Patent Application No. 19153749.7.
(Continued)

*Primary Examiner* — George B Bennett
(74) *Attorney, Agent, or Firm* — Oliff PLC (57) ABSTRACT

A hard-wired measurement device is mountable within an enclosure of a computer-controlled machine tool. The device includes a measurement sensor for measuring objects, such as tools, within the machine tool enclosure and a hard-wired interface module for providing an electrical connection via one or more wires with an associated external interface located outside of the machine tool enclosure. The device further includes a wireless communications module that enables wireless communication with an associated wireless device, such as a spindle probe, located within the machine tool enclosure.

20 Claims, 7 Drawing Sheets

(58) Field of Classification Search
USPC .......................................... 33/628, 638, 642
See application file for complete search history.

(56) References Cited

U.S. PATENT DOCUMENTS

| | | | |
|---|---|---|---|
| 6,583,883 B2* | 6/2003 | Egelhof | B23Q 17/09 |
| | | | 382/152 |
| 9,669,505 B2* | 6/2017 | Angel | B23Q 17/00 |
| 9,733,060 B2* | 8/2017 | Ould | G01B 7/012 |
| 10,579,043 B2* | 3/2020 | Kanja | G05B 19/4155 |
| 11,674,789 B2* | 6/2023 | Styles | G01B 21/04 |
| | | | 33/504 |
| 2014/0011444 A1 | 1/2014 | Groell et al. | |
| 2018/0356788 A1 | 12/2018 | Moersch et al. | |

FOREIGN PATENT DOCUMENTS

| | | |
|---|---|---|
| DE | 102008017349 A1 | 10/2009 |
| EP | 1050368 A1 | 11/2000 |
| EP | 3413150 A1 | 12/2018 |
| WO | 2004/057552 A1 | 7/2004 |
| WO | 2015/162431 A1 | 10/2015 |
| WO | 2018/033704 A1 | 2/2018 |

OTHER PUBLICATIONS

May 4, 2020 International Search Report issued in International Patent Application No. PCT/GB2020/050165.
May 4, 2020 Written Opinion issued in International Patent Application No. PCT/GB2020/050165.

* cited by examiner

MEASUREMENT DEVICE FOR A MACHINE TOOL

The present invention relates to a measurement device for a machine tool and in particular to an improved device for wireless communication with a device located within the enclosure of the machine tool.

It is known to mount measurement devices within the enclosure of a machine tool. Such measurement devices may be used to measure the cutting tools used by the machine tool or to inspect workpieces that have been cut by the machine tool.

Measurement devices are known that are secured to a fixed surface of the machine tool and connected to an external interface via an electrical cable. For example, tool setting devices may be bolted to the bed of the machine tool and hard-wired to an external interface. An example of such a device is the NC-4 laser tool setting device sold by Renishaw plc, Wotton-Under-Edge, UK. See also EP1050368.

In some circumstances, it is not possible or practical to provide a hard-wired (cabled) connection to the measurement device. For example, so-called spindle probes are carried by the moveable spindle of the machine tool for measuring workpieces. Spindle probes are typically only used for short periods of time between cutting operations and are thus usually automatically loaded into the machine tool spindle as and when they are required. Battery operated spindle probes are thus known that communicate wirelessly with a receiver that is secured to a fixed surface within the machine tool enclosure. The receiver is then connected with a cable to a probe interface located outside of the machine tool enclosure. An example of such a spindle probing system is the RMP600/RMI system sold by Renishaw plc, Wotton-Under-Edge, UK. See also WO2004/057552.

Although providing hard-wired connections to measurement sensors or wireless interfaces contained within a machine tool enclosure is possible during manufacture or initial configuration of a machine tool, it is difficult and time-consuming to add such hardwired connections afterwards. This makes it difficult to retrofit additional measurement functionality to machine tools, for example when a user wishes to perform different or more complex measurements using the machine tool.

According to a first aspect of the present invention, there is provided a hard-wired measurement device for mounting within an enclosure of a machine tool, comprising; a measurement sensor for measuring objects within the machine tool enclosure, a hard-wired interface module for providing an electrical connection via one or more wires with an associated external interface located outside of the machine tool enclosure, and a wireless communications module enabling wireless communication with an associated wireless device located within the machine tool enclosure, wherein the hard-wired measurement device comprises a housing containing the measurement sensor, the hard-wired interface module and the wireless communications module, the housing being mountable within the enclosure of a machine tool.

The hard-wired measurement device of the present invention is thus suitable for use in the harsh environment typically found within the enclosure of a machine tool; the machine tool enclosure being the protective housing or casing that surrounds the working volume where machining (e.g. drilling, milling, cutting) operations are performed on a workpiece. The measurement device comprises a measurement sensor that can be used to perform so-called "on-machine" measurements of objects (such as tools). As described below, in one embodiment the measurement sensor may perform a contact or non-contact tool measurement or so-called tool-setting function. A hard-wired interface module is also provided as part of the device that, in use, is connected by one or more electrical wires (which may be bundled within a cable) to an associated external interface that is not located within the machine tool enclosure. For example, the associated external interface may be located with or adjacent to the computer numerical controller (CNC) that controls machine tool operation. The associated external interface may alternatively be integral with the CNC (e.g. it may comprise a bespoke interface card within the CNC or its function may be performed by a suitably programmed part of the CNC).

In addition to having a measurement sensor that performs a measurement function, the device of the present invention also comprises a wireless communications module. As explained above, the hard-wired measurement device is, in use, located within the machine tool enclosure (e.g. attached to the table or bed of the machine tool). The wireless communications module is thus located within the machine tool enclosure and is ideally placed to communicate wirelessly with an associated wireless device present in the machine tool enclosure (the associated wireless device not being the above described measurement sensor). For example, a wireless link (which may be a one-way or two-way link) can be established between the wireless communications module and a wireless measurement probe that is carried by the spindle of the machine tool and used for measuring objects within the machine tool enclosure.

As explained in more detail below, the hard-wired measurement device of the present invention includes a housing (which may be a unitary housing or formed from a plurality of housing portions or units) that contains the measurement sensor, the hard-wired interface module and the wireless communications module. The housing is mountable within the machine tool enclosure; e.g. it may be mounted to the bed of the machine tool onto which workpieces are secured for machining operations. The device of the present invention thus provides, within a single housing, both a measurement device (e.g. a tool-setter) and a wireless interface for a wireless device (e.g. for communication with a spindle probe).

The above described arrangement has the advantage of reducing the number of components that need to be mounted within the machine tool enclosure thereby saving valuable space and reducing the possibility of physical damage to the installed equipment. It also means that a single cable can to be used to connect both the measurement device and wireless interface to an external interface thereby reducing the number of holes that need to be formed in the machine tool housing for the passage of such cables. The present invention also allows extra functionality to be added to machine tool systems after initial installation without having to form holes in the machine tool casing for additional cables etc.

The measurement sensor may be of any suitable type. The measurement sensor may be a contact sensor. The measurement sensor may be a non-contact sensor. The measurement sensor may be configured to measure workpieces being produced by the machine tool. Advantageously, the measurement sensor is configured to measure a cutting tool carried by the associated machine tool (e.g. in a spindle or tool holder of machine tool). The measurement sensor may comprise a non-contact tool setter comprising a light transmitter and a light receiver. Alternatively, the measurement sensor may comprise a contact tool-setting probe. The contact tool-setting probe may comprise a (protruding) deflectable stylus and a deflection sensor for sensing stylus deflection.

Advantageously, the hard-wired interface module receives electrical power from the associated external interface via the one or more wires. In other words, the device preferably receives its electrical power via the hard-wired interface module. The electrical power is conveniently used to power both the measurement sensor and the wireless communications module. Separate power supply lines may be used to power the measurement sensor and the wireless communications module. Alternatively, all power may be derived from a common power supply line.

Advantageously, at least one output derived from the measurement sensor is passed from the hard-wired interface module to the associated external interface via the one or more wires. The output derived from the measurement sensor may be a raw sensor signal; e.g. an analogue voltage value related to received light intensity or stylus deflection. Alternatively, the raw sensor signal may be processed in some way before being output. For example, the device may include processing electronics that analyse a raw signal from the measurement sensor and generates an appropriate output. In one example, the output passed to the associated external interface may be a trigger signal that indicates a raw sensor signal (e.g. related to received light intensity or stylus deflection) has crossed a certain threshold. The output may be a digital output. The output may be an analogue output. A single output derived from the measurement sensor may be passed to the external interface. Alternatively, a plurality of outputs (e.g. a processed trigger signal and a raw sensor signal) may be passed to the external interface.

Advantageously, the hard-wired interface module also interfaces the wireless communications module with the associated external interface. In other words, a hard-wired connection is provided via the hard-wired interface module between the wireless communications module and an external interface that controls the wireless communications module. The wireless communications module can thus communicate wirelessly with another wireless device (e.g. a wireless measurement probe) located within the machine tool enclosure and data received from the wireless device is passed to the external interface over the hard-wired connection. The communication may be one-way; e.g. to just receive data (such as measurement data) from the wireless device. Alternatively, the communications link may be two-way thereby enabling data to be passed back and forth between the associated wireless device and the external interface.

The hard-wired measurement device may comprise a unitary housing. The measurement sensor, the wireless communications module and the hard-wired interface module may be contained within such a unitary housing. In other words, the hard-wired measurement device may be formed from a housing that comprises a single, integrated, unit. In such an embodiment, the measurement sensor, the hard-wired interface module and the wireless communications module are not separable from each other during normal use. It should, however, be noted that the unitary housing could be made from multiple parts that are affixed to one another during the product manufacturing process. The footprint or shape of the device may conveniently be similar to that of a prior art measurement device that does not include a wireless communications module. For example, the unitary housing may have similar shape or footprint as the NC4 product mentioned above.

Advantageously, the hard-wired measurement device is formed from a plurality of units or portions that are physically attachable to one another. In other words, the device may have a modular (non-unitary) construction in which the various parts of the device can be assembled and disassembled by a user as required. In a preferred embodiment, the housing is formed from a plurality of releasably attachable housing portions. In one example, the housing may be formed from a first housing portion and a second housing portion. The housing may also comprise a third housing portion. The first housing portion may comprise the measurement sensor. The second housing portion may comprise at least part of the wireless communications module. The third housing portion may comprise the hard-wired interface module (i.e. that is connectable to one or more wires). At least one of the plurality of housing portions may comprise a base that is configured for attachment to the enclosure of the machine tool. For example, the third housing portion may include a base or other attachment means for securing it to the enclosure of the machine tool. The first housing portion (e.g. containing the measurement sensor) may then be directly attachable to the third housing portion or the second housing portion may be placed between the first and third housing portions.

As described in the various examples below, the hard-wired measurement device may be formed in various different ways using a variety of different modular components. For example, the hard-wired measurement device may comprise a base unit (base portion) and a measurement unit (measurement portion). The measurement unit may be releasably attachable (directly or indirectly) to the base unit. The measurement unit may comprise the measurement sensor. The base unit may comprise the hard-wired interface module that is connectable to the one or more wires. At least part of the wireless communications module may be provided in the base unit. In one example, the entire wireless communications module is provided in the base unit. At least part of the wireless communications module may be provided in the measurement unit. In one example, the entire wireless communications module is provided in the measurement unit. Alternatively, the components of the wireless communications module may be spread across the base and measurement units. For example, the wireless communications module may comprise a modem (which might also be termed a transceiver). If operating at radio frequencies, the wireless communications module may comprise an antenna. In such an example, the modem may be provided in the base unit and the antenna in the measurement unit (or vice versa). It should be remembered that the wireless communications module may transmit/receive optical signals. In such an example, the wireless communications module may include a modem, one or more light sources (e.g. light emitting diodes) and/or one or more light sensors. The components of such an optical system may also be distributed as required between the base and measurement units.

In one embodiment, a communications unit (communications portion) may be provided that contains at least part of the wireless communications module. Conveniently, all of the wireless communications module may be contained in the communications unit. The communications unit may be releasably attachable to the remainder of the hard-wired measurement device. This enables a wireless communications function to be added and/or removed as required. For example, a user could simply add a communications unit in order to provide additional measurement functionality (e.g. by enabling communications with a spindle probe). The communications unit may, for example, be attachable to a base unit or a measurement unit of the type described above. In one embodiment, the communications unit may be sandwiched between the base unit and the measurement unit.

The hard-wired interface may be permanently connected to the one or more wires. For example, a cable may be secured directly (e.g. moulded or integrally fixed) to the device. Conveniently, the hard-wired interface module comprises a first electrical connector. The first electrical connector is preferably configured to enable an electrical connection to be established with a second (complementary) electrical connector that is connected to the one or more wires. It should be noted that the one or more wires are conveniently bundled into at least one cable. For example, a single (multi-core) cable may be used. It would, however, also be possible to distribute the wires over a plurality of cables or to use multiple individual wires. If a cable is provided, the cable may terminate with the above described second electrical connector.

The wireless communications module may be of any suitable type. The wireless communications module may provide optical wireless communication. Alternatively, the wireless communications module may provide radio-frequency (RF) wireless communication. Such RF communication may be within the 2.4 GHz radio band. The wireless communications module may transmit and/or receive an analogue signal. Alternatively, the wireless communications module may implement digital communications. For example, a channelized or spread-spectrum (e.g. frequency hopping or direct sequence) RF communications link may be provided. The wireless communications module preferably implements a real-time communication protocol (e.g. to enable the transmission of time critical measurement data). For example, the spread spectrum communications technique described in WO2004/057552 may be used.

The device conveniently comprises a housing having at least one portion that is substantially transparent to the radiation of the wireless communications module. In a preferred embodiment, the wireless communications module is an RF communications module. The device may comprise a housing having at least one RF-transparent portion. The wireless communications module may comprise an RF antenna that is located adjacent each RF-transparent portion. As explained above, the hard-wired measurement device may be of unitary or modular construction and in such an example an RF-transparent portion may be provided as part of one or more of the modules or housing portions forming that device. A single RF-transparent portion may be provided. Alternatively, a plurality of RF-transparent portion may be provided. Each RF-transparent portion may be formed from a non-metal material such as plastic, glass or ceramic. An air nozzle may be provided to direct a flow of air over each RF-transparent portion to prevent the collection of cutting debris or coolant that might otherwise obscure the RF-transparent portion. Such an air nozzle may be external to the device. Conveniently, such an air nozzle may be integral to the device.

The RF-transparent portion may be substantially flat. For example, it may comprise an RF-transparent window. Advantageously, the at least one RF-transparent portion comprises at least one dome shaped projection. Each dome shaped projection conveniently houses an RF antenna. The use of a dome shaped projection increases the angle over which RF signals may be transmitted and/or received thereby increasing the coverage provided within the RF enclosure. A plurality of such dome shaped projection may be used to increase the coverage further and/or provide resilience to transient RF obstructions within the machine tool enclosure. Appropriately transparent portions may be provided if other radiation (e.g. light) is used.

The present invention also extends to an apparatus comprising the hard-wired measurement device described above in combination with a wireless device that can communicate wirelessly with the wireless communications module of the hard-wired measurement device. Advantageously, the wireless device is a wireless (e.g. RF) measurement device. Preferably, the wireless device is a battery powered measurement probe. The battery powered measurement probe may be configured for mounting in a spindle of a machine tool. The battery power measurement probe may include a measurement sensor and a deflectable stylus. Alternatively, the wireless device may comprise a temperature sensing probe, a pressure measurement probe or a camera. The wireless measurement device may perform a different measurement function to the measurement sensor of the hard-wired measurement device.

The apparatus may further comprise an external interface. A cable comprising a plurality of wires may also be provided. The cable may be used to connect the hard-wired interface module of the hard-wired measurement device to the external interface. Again, it should be noted that a single cable is convenient but multiple cables could instead be used. The external interface may be provided as a single unit. Alternatively, the interface may be formed from a plurality of separate interface units. For example, a first external interface unit could be hardwired to the measurement sensor of the hard-wired measurement device and a second external interface unit could be hardwired to the wireless communications module. The external interface may be appropriately connected to the control of the machine tool. The control of the machine tool may also perform all or some of the interface function, depending on the type of control.

The present invention also extends to a machine tool comprising the apparatus described above. A method of using the apparatus to communicate with an associated wireless device is also described.

A second aspect of the present invention thus extends to a machine tool apparatus comprising a machine tool having an enclosure in which a workpiece can be machined and a hard-wired measurement device located within the enclosure, the hard-wired measurement device comprising; a measurement sensor for measuring objects within the machine tool enclosure, a hard-wired interface module for providing an electrical connection via one or more wires with an external interface located outside of the machine tool enclosure, and a wireless communications module enabling wireless communication with an associated wireless device located within the machine tool enclosure.

The hard-wired measurement device may comprise a housing containing the measurement sensor, the hard-wired interface module and the wireless communications module. The housing, which may be modular or unitary, is conveniently mounted within the enclosure of the machine tool. Advantageously, the machine tool comprises a bed onto which workpieces can be placed, the housing of the hard-wired measurement device being mounted to the bed of the machine tool. Alternatively, the parts of the hard-wired measurement device may be provided in a plurality of housings (e.g. connected together by cables) instead of in a single housing.

As outlined above, the measurement sensor may be configured to measure a cutting tool carried by the associated machine tool. The apparatus may further comprise a wireless device located within the machine tool enclosure, the wireless device being configured for wireless communication with the wireless communications module of the hard-wired measurement device.

Also described herein is a hard-wired measurement device mountable within an enclosure of a machine tool. The hard-wired measurement device may comprise a measurement sensor for measuring objects within the machine tool enclosure. The hard-wired measurement device may comprise a hard-wired interface module for providing an electrical connection via one or more wires with an associated external interface located outside of the machine tool enclosure. The hard-wired measurement device may comprise a wireless communications module. The wireless communications module may enable wireless communication with an associated wireless device located within the machine tool enclosure. The device may be provided within a unitary housing. Alternatively, the device may comprise a (non-unitary) housing formed from two or more housing portions. The housing portions may be assembled to provide the hard-wired measurement device. The device may have any of the other features, either alone or in combination, that are described herein.

Also described herein is a tool-setting device mountable within an enclosure of a machine tool, comprising; a measurement sensor for measuring a tool, and a hard-wired interface module electrically connecting the measurement sensor with an associated interface module located outside the machine tool enclosure via a plurality of wires, wherein the tool-setting device further comprises a wireless communications module for wireless communication with a measurement probe located within the machine tool enclosure. The device may have any of the features, either alone or in combination, that are described herein.

The invention will now be described, by way of example only, with reference to the accompanying drawings in which:

FIG. 7 shows a variant to the device of FIG. 6, FIG. 8 show an alternative hard-wired measurement device formed from multiple units, FIG. 9 show a stacked hard-wired measurement device formed from three units.

Figure 1:
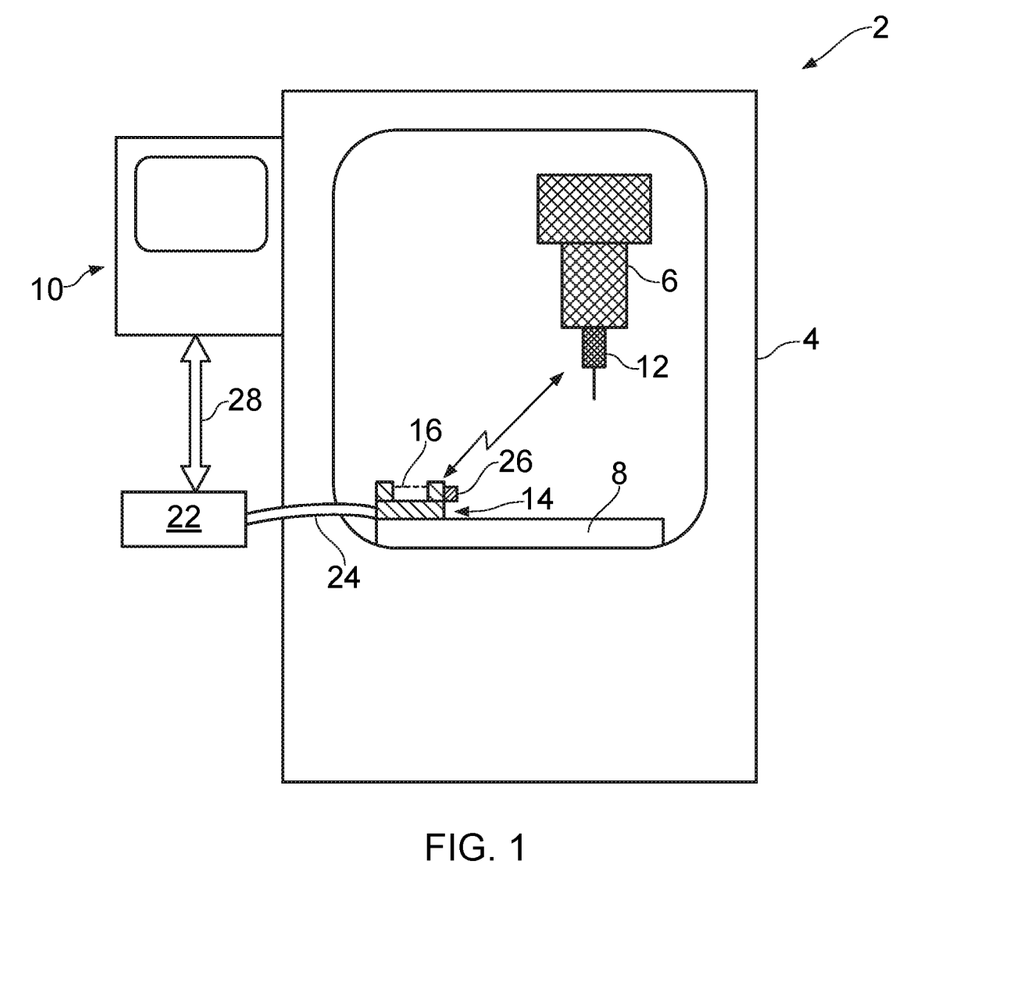
FIG. 1 shows a hard-wired measurement device of the present invention mounted within a machine tool enclosure.

Referring to FIG. 1, there is schematically illustrated a machine tool 2 having a protective enclosure or housing 4. A spindle 6 and a table 8 are located inside the enclosure 4. The spindle 6 is rotatable and also moveable relative to the table 8 under the control of a machine tool controller 10. To perform a cutting operation, a cutting tool is carried by the spindle 6 and moved along a pre-programmed cutting path relative to a workpiece (not shown) mounted to the table 8. The spindle 6 can also carry a spindle probe 12 as shown in FIG. 1 that enables workpieces to be measured. An automatic tool changer (not shown) is typically provided as part of the machine tool 2 to enable cutting tools, spindle probes and other accessories to be automatically loaded into the spindle 6 under the control of the controller 10 as required.

A hard-wired non-contact (laser) based tool-setting device 14 is secured (e.g. bolted) to the table 8 within the machine tool enclosure 4. The tool-setting device 14 passes a light (e.g. laser) beam 16 from a transmitter to a receiver and issues a so-called "trigger signal" whenever the light beam is interrupted (e.g. by the tip of a tool being moved into the light beam). The tool-setting device 14 thus includes a measurement sensor which allows tools carried by the spindle 6 to be measured (e.g. to find a tool length or diameter). Any such tool measurements can be used by the controller 10 to ensure the workpiece is cut to the desired size and shape. The tool-setting device 14 is connected to an external interface 22 by a cable 24 that includes multiple wires (cores). Power is passed to the tool-setting device 14 via the cable 24 and the trigger signal is also passed to the external interface 22 via the same cable 24. Configuration commands etc may also be sent to the tool-setting device 14 from the external interface 22 via the cable 24.

The tool-setting device 14 of FIG. 1 differs from known tool setting devices in that it also includes an RF communications module 26. The RF communications module 26 is also hardwired to the external interface 22 via the cable 24 (i.e. it receives power and transmits/receives data from the external interface 22 via common cable 24). The location of the RF communications module 26 on the table 8 of the machine tool enclosure ensures that it can wirelessly communicate with other measurement devices located within the machine tool enclosure. In this example, the RF communications module 26 is configured to communicate with the battery powered spindle probe 12. Measurement data from the spindle probe 12 is thus passed wirelessly (over the RF link) to the RF communications module 26 and then along the cable 24 to the external interface 22. The external interface 22 may then pass measurement data (e.g. trigger signals) to the machine tool controller 10 and/or an external computer as required via a communications link 28.

Although a single external interface 22 is illustrated, it would be possible to split the interface function over multiple interface units. For example, a first external interface unit could be hardwired to the measurement sensor of the non-contact tool setting device and a second external interface unit could be hardwired to the wireless communications module. The single (multi-core) cable 24 as illustrated is preferred for simplicity and robustness, but it is not essential. Instead, the various wires carrying power and/or data signals could be bundled within two or more cables or not bundled into a cable at all. Data can be passed/received from the non-contact tool setting device and the wireless communications module over different, discrete, sets of wires. Alternatively, a common data bus or data busses (e.g. Ethernet, real time Ethernet, Fieldbus links etc) could be provided to carry data from both the non-contact tool setting device and the wireless communications module.

As explained above, the device described herein has the advantage that there only needs to be a single cable passed from the exterior to the interior of the machine tool enclosure 4. This means that if the tool-setting device 14 is installed during machine tool manufacture, it is easy for a user to add extra measurement functionality without having to pass another cable through the enclosure (which would typically involve drilling various holes in the enclosure). For example, a spindle probe could be easily added to a machine tool that was initially only set up for non-contact tool measurements if the user wanted to add such measurement functionality at a later date. The presence of a single device within the machine tool enclosure also reduces the amount of space within the enclosure that is taken up by measurement equipment and decreases the likelihood of cable damage by reducing the total length of cable within the enclosure. The device also allows the RF communications portion to be placed in a prominent, central location within the working volume of the enclosure thereby ensuring good communications can be maintained with the wireless measurement probe 12.

Figure 2:
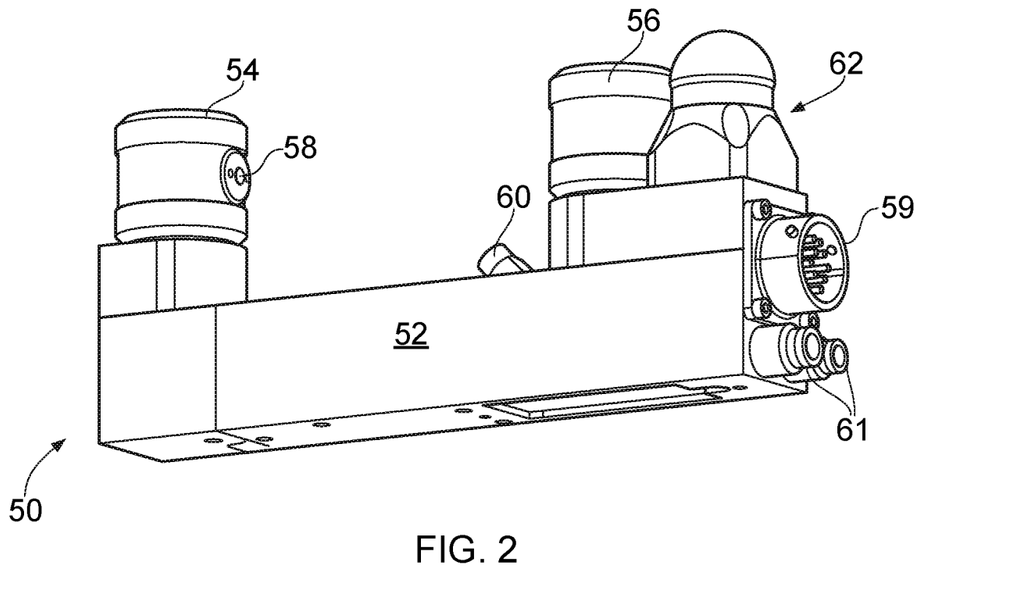
FIG. 2 shows one embodiment of a hard-wired measurement device in more detail.

Referring to FIG. 2, a hardwired measurements device 50 of the present invention is illustrated in more detail.

The device 50 comprises a base portion 52 that can be bolted to the table of a machine tool. A transmitter unit 54 and a receiver unit 56 protrude upwardly from the base portion 52. The transmitter unit 54 comprises a laser that, in use, emits a laser beam through the transmitter aperture 58 toward the receiver unit 56. The receiver unit 56 comprises a receiver aperture (not visible in the view of FIG. 2) and a photodetector that detects the received intensity of the laser beam. As is known, a flow of air is provided through the transmitter and receiver apertures to help prevent contamination of the transmitter and receiver units by coolant and cutting debris. An air blast nozzle 60 is also provided for directing air towards a tool that is to be measured. Inlets 61 are provided for receiving the appropriate air supply. Electrical signals are passed between the transmitter/receiver units and an external interface via a first set of wires within a multi-core cable that is connectable to the multi-core electrical connector 59. Thus far, these features are all similar to those of the NC4 tool setting device mentioned above.

In addition to the non-contact measurement features, the device 50 also includes a RF communications module 62. The RF communications module 62 includes a domed structure 64 (or radome) formed from a material that is substantially transparent at RF frequencies. An RF antenna is housed within the domed structure 64 and can thus receive/transmit RF signal from a wireless device. The RF antenna may be a monopole, slot, patch or planar inverted F antenna. The protruding dome structure 64 maximises the omni-direction performance (i.e. optimises the radiation polar pattern). An RF modem is also contained within the RF communications module 62 and is connected to the RF antenna (e.g. via a coaxial cable, spring pins or PCB waveguide). The RF modem may comprise a Nordic Semiconductors RF transceiver (namely nRF52832) which also includes an ARM processor. Preferably, the RF communications module 62 uses 2.4 GHz radio. The RF modem is hardwired to the external interface via a plurality of wires within a cable that, in use, is connected to the multi-core electrical connector 59. In this manner, a hard-wired electrical connection is provided (via the electrical connector 59 and an associated cable) between an external interface and both the non-contact measurement sensor and the RF communications module 62.

Figure 3:
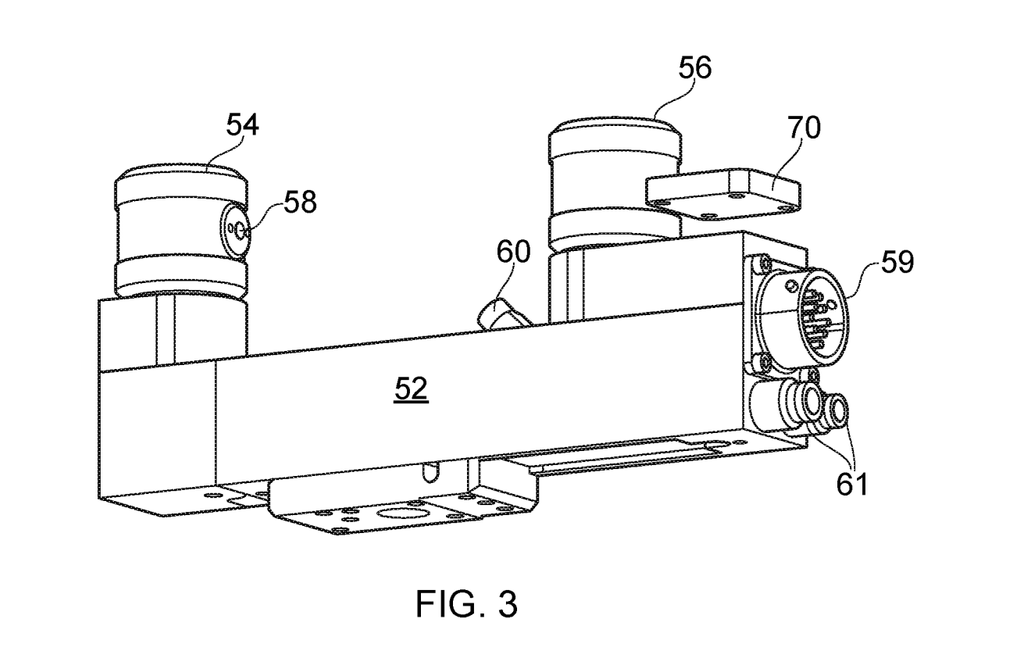
FIG. 3 shows the device of FIG. 2 with a blanking plate replacing the wireless communications module.

Referring now to both FIGS. 2 and 3, the RF communications module 62 may be removeable. As shown in FIG. 3, the RF communications module 62 shown in FIG. 2 can be detached from the base portion 52. The RF communications module 62 may thus be attached only when needed and a cover plate 70 used to seal the device when the RF communications module 62 in not present. This arrangement allows a device that is initially absent the RF communications module 62 to be upgraded as and when required to include such a wireless communications function. For example, a post-installation upgrade may be performed in which the cover plate 70 is removed and replaced by the RF communications module 62. This upgrade does not disturb any part of the machine tool or require the running of additional cables out of the enclosure etc. Alternatively, instead of the modular arrangement, the apparatus shown in FIG. 2 may be formed as a single, integrated unit (i.e. the RF communications module 62 may be permanently integrated into the device).

Figure 4:
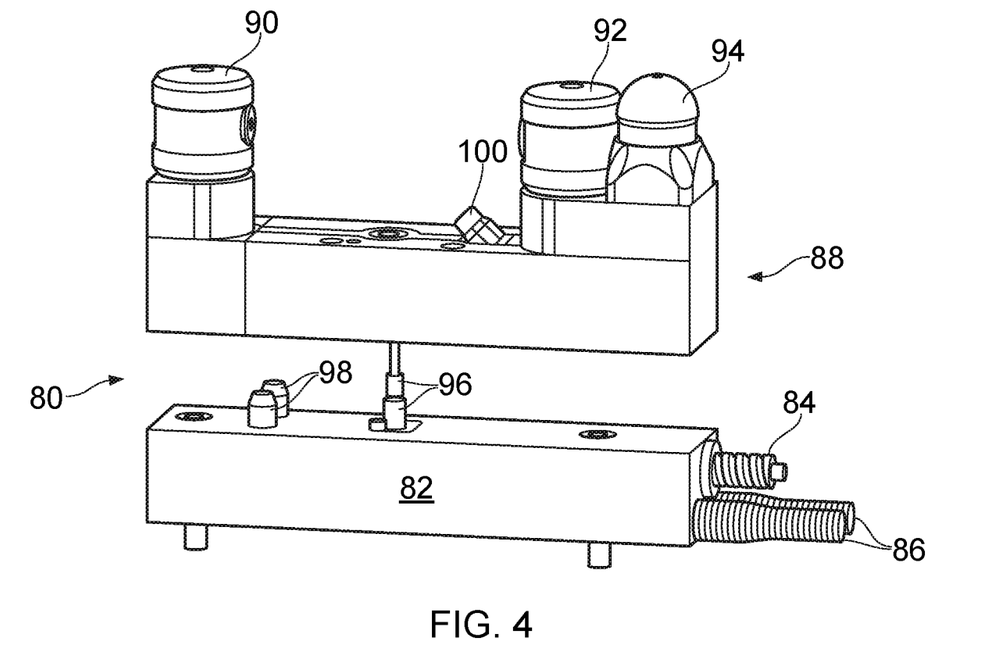
FIG. 4 shows a hard-wired measurement device having a base unit and a measurement unit.

Referring to FIG. 4, an alternative embodiment is illustrated that comprises a modular (non-unitary) hard-wired measurement device 80. The device 80 comprises a base unit 82 that can be secured to the table within a machine tool enclosure. The base unit 82 has a multi-wire electrical cable 84 attached to it along with pneumatic inlets 86. A measurement unit 88 comprises a transmitter unit 90 and a receiver unit 92 that together provide a non-contacting tool-setting function as described in detail above. The measurement unit 88 also comprises a RF communications module 94 of the type described with reference to FIG. 2 above. The measurement unit 88 is releasably attachable to the base unit 82. In particular, the measurement and base units may be bolted together. The necessary electrical connections are made between the measurement and base units by a pair of electrical connectors 96 that are engaged prior to mechanically fixing the measurement unit 88 to the base unit 82. Alternatively, all or some of the electrical connections may be made by inductive/optical couplings or the like. Pneumatic connectors 98 route compressed air from the pneumatic inlets 86 to the transmitter/receiver units and the air blast nozzle 100. The measurement unit 88 of the device 80 may thus be removed and replaced from the base unit 82 as required. An alternative measurement unit (not shown) that only includes the non-contact tool setter functions (i.e. not the RF communications module 94) may also be substituted for the measurement unit 88. For example, such an alternative measurement unit may be initially installed in the machine tool and upgraded to the measurement unit 88 if additional RF communications functionality is needed.

Figure 5:
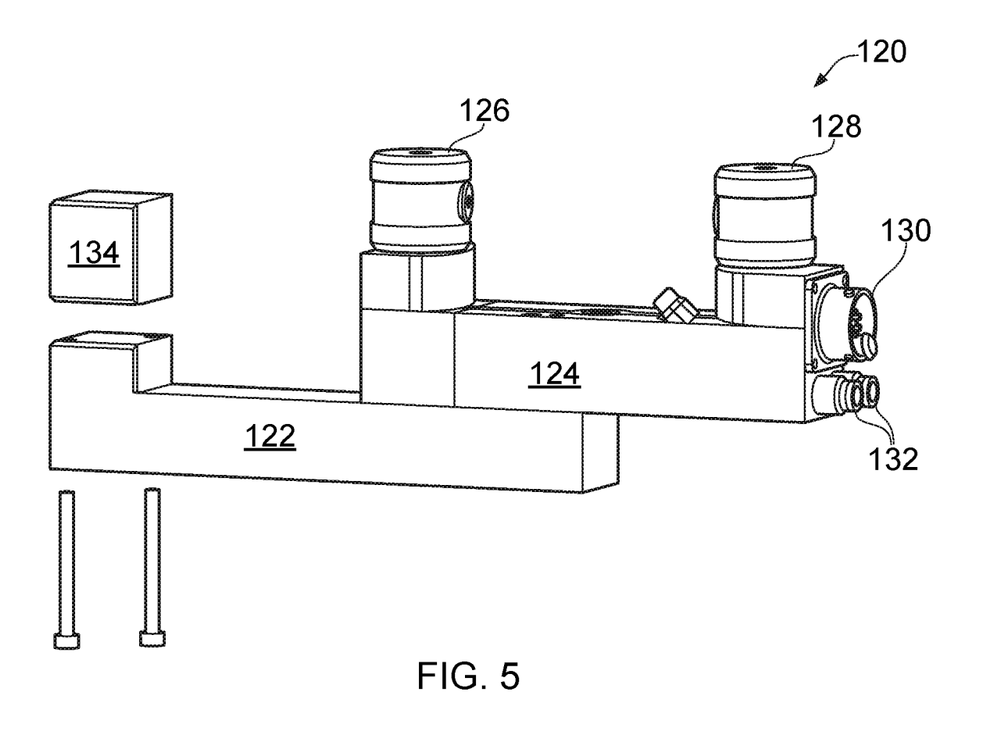
FIG. 5 shows a hard-wired measurement device formed from multiple units.

FIG. 5 illustrates a further example of a modular hard-wired measurement device 120. The device 120 comprises a base unit 122 that can be attached (bolted) to the table of a machine tool. A non-contact tool setting measurement sensor unit 124 is attachable to the base unit. The non-contact tool-setting measurement sensor unit 124 comprises a transmitter unit 126 and a receiver unit 128, an electrical connector 130 and pneumatic inlets 132. A RF communications module 134 is releasably mountable to the base unit 122. Electrical connectors (not shown) allows the RF communications module 134 to be electrically connected to the non-contact tool-setting measurement sensor unit 124; this may be a direct connection between the units or via the base unit 122. The electrical connector 130 thus allows both the RF communications module 134 and the non-contact tool setting measurement sensor unit 124 to be hard-wired to an external interface. The RF communications module 134 may be attached to the base unit 122 as and when required (e.g. after initial installation).

Figure 6:
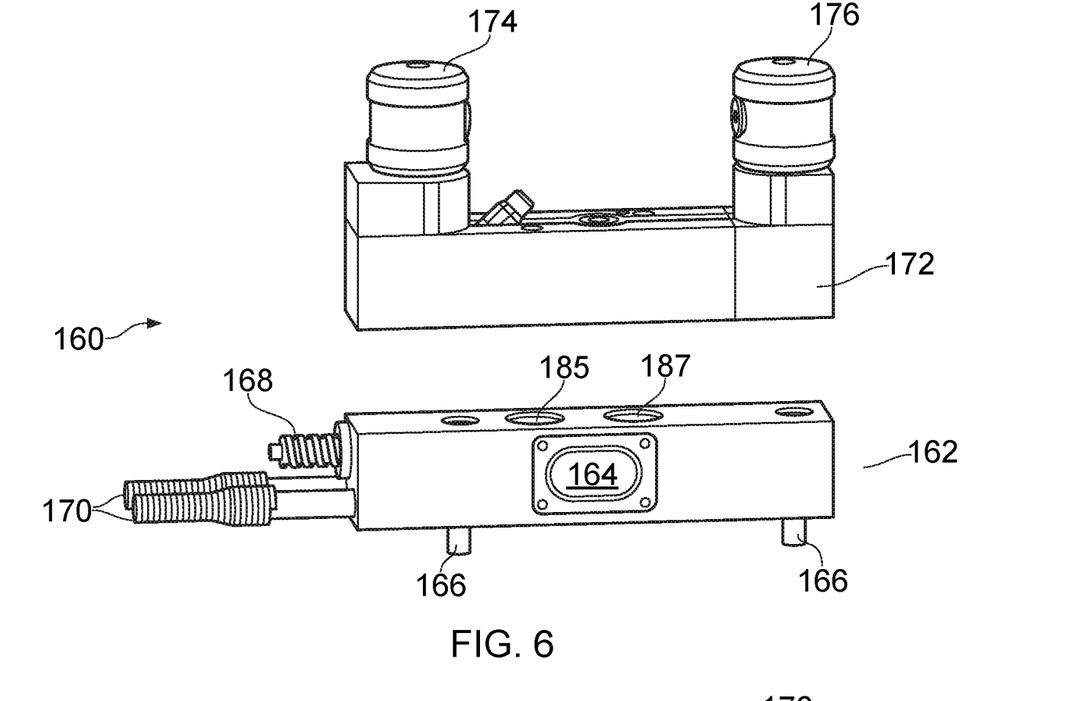
FIG. 6 shows a hard-wired measurement device having a base unit comprising an RF antenna.

Referring to FIG. 6, another example of a modular hard-wired measurement device 160 is shown. The device 160 comprises a base unit 162 that is attachable (e.g. by bolts 166) to the table of a machine tool and comprises a housing with an RF-transparent window portion 164. An antenna (not shown) is located on the inside of the housing adjacent the window portion 164 and a RF modem (not shown) is also provided within the housing of the base unit 162; together the antenna and RF modem form an RF communications module. In a similar manner to that described above, the RF communications module allows wireless communication with an associated device (e.g. measurement probe) to be established. An electrical cable 168 and compressed air supply lines 170 are connected to the base unit 162. A measurement unit 172 is attachable to the base unit 162. The measurement unit 172 provide a non-contact tool-setting function and comprises a transmitter unit 174 and a receiver unit 176 of the type described above. Appropriate electrical connections using physical connectors or wireless transmission (e.g. an inductive connection 185 for power and an optical connection 187 for data) are provided between the base unit 162 and the measurement unit 172 to power and communicate with the non-contact tool setting components.

Figure 7:
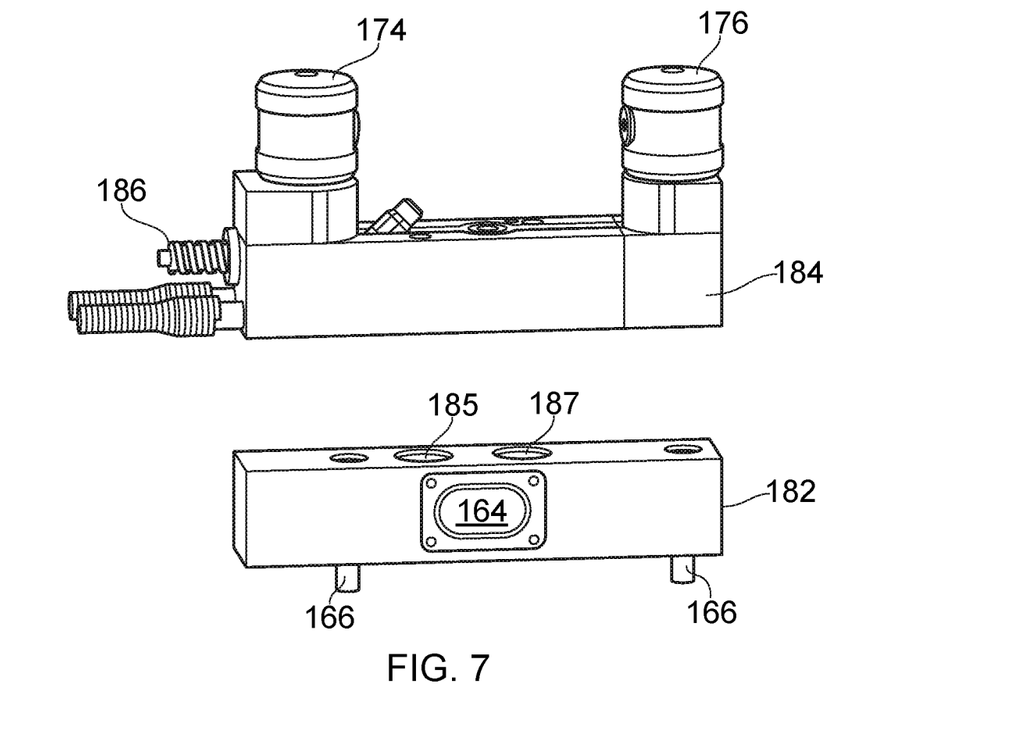

Referring to FIG. 7, a variant of the device shown in FIG. 6 is illustrated. Again, the device comprises a base unit 182 and a measurement unit 184. The base unit 182 includes the window portion 164 and a RF communications module. The measurement unit 184 includes the transmitter unit 174 and receiver unit 176 that provide the non-contact tool-setting measurements. In this example, an electrical cable 186 is connected to the measurement unit 184. Appropriate electrical connections using physical connectors or wireless transmission (e.g. an inductive connection 185 for power and an optical connection 187 for data) are provided between the measurement unit 184 and the base unit 182 to power and communicate with the RF communications module in the base unit 182.

Figure 8:
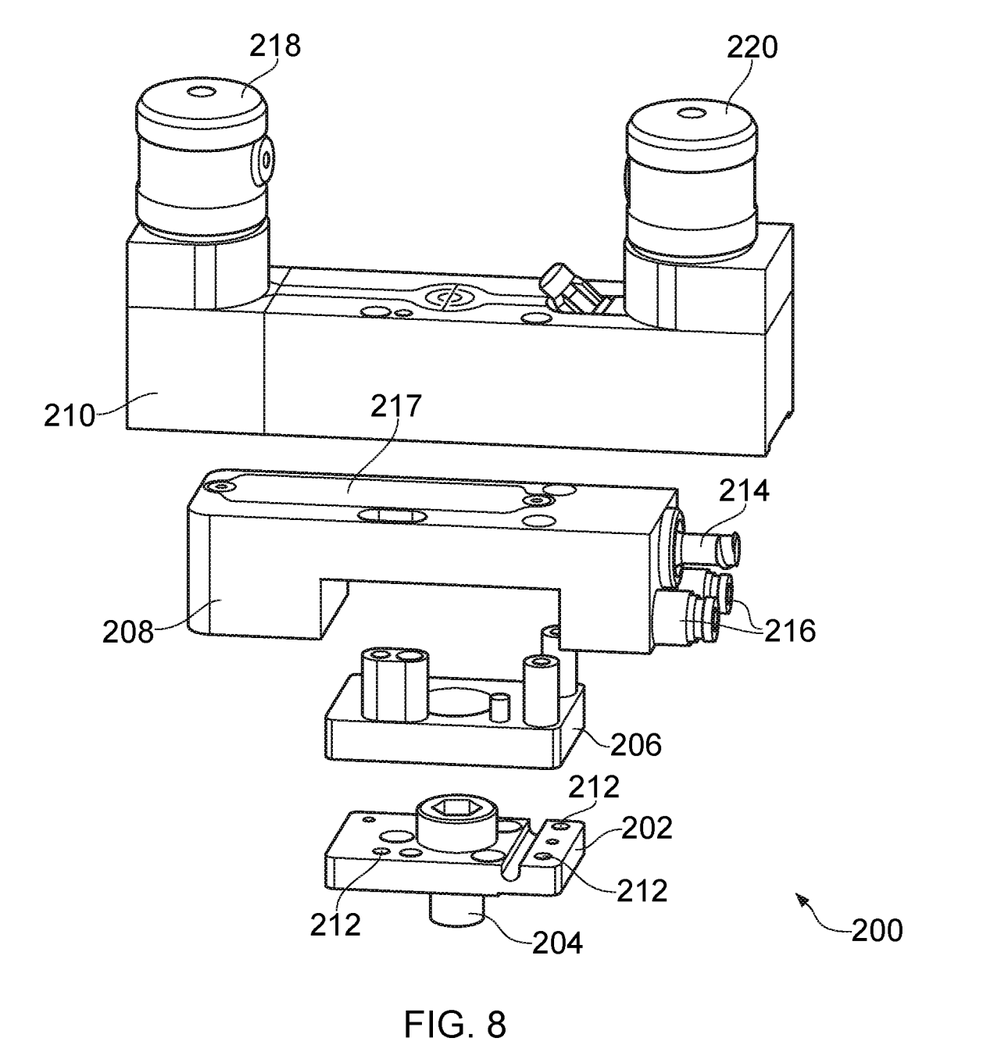

Referring to FIG. 8, a four-part modular hard-wired measurement device 200 is shown. The device 200 comprises a bottom plate 202 that can be attached to the table of a machine tool by a bolt 204. A load-carrying spacer plate 206 can be located on the bottom plate 202 and a non-loadbearing base unit 208 located around the spacer plate 206. A measurement unit 210 (having a transmitter unit 218 and receiver unit 220) can then be placed onto the base unit 208 and secured thereto using bolts that extend through each of the base unit 208 and the spacer plate 206 and attach to threaded holes 212 provided in the bottom plate 202. The non-loadbearing base unit 208 thus carries none of the weight of the measurement unit 210 (which is secured directly to the spacer plate 206). An RF communications module is provided within the non-loadbearing base unit 208 and is accessible via a cover plate 217. The base unit 208 also receives the electrical cable 214 and has compressed air inlets 216. Providing a non-loadbearing base unit 208 allows the casing thereof to be formed from an RF-transparent (e.g. non-metallic) material such as plastic or ceramic. Appropriate electrical connections (not shown) using physical connectors or wireless (e.g. inductive/optical) transmission are provided between the base unit 208 and the measurement unit 210 to power and communicate with the non-contact tool setting components. Compressed air connections (not shown) between the base unit 208 and the measurement unit 210 are also provided.

Figure 9:
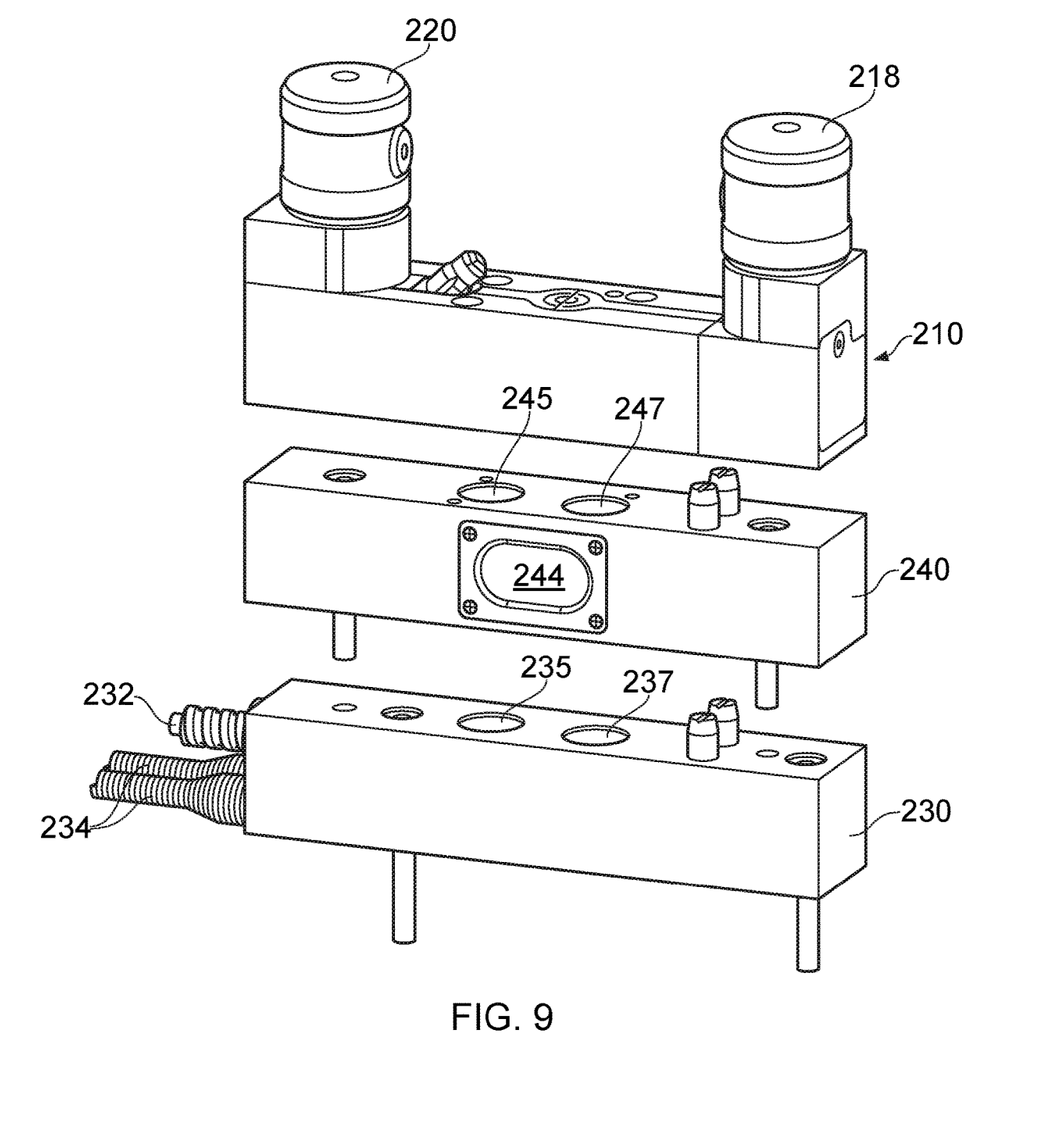

FIG. 9 illustrates a further variant of the present invention. The hardwired measurement device is formed from a measurement unit 210 (having a transmitter 218 and receiver 220), a base unit 230 and a RF communications unit 240.

The base unit 230, which can be bolted to the table of the machine tool, is connected to an electrical cable 232 and compressed air supply lines 234. The RF communications unit 240 includes all the components of the RF communications module that are described in more detail above. In particular, an antenna (not shown) is located within the housing of the RF communications unit 240 adjacent the window portion 244 and a RF modem (not shown) is also contained within the RF communications unit 240. The RF communications unit 240 can be physically attached (bolted) to the base unit 230. The base unit 230 also connects wirelessly (via an inductive connection 235 for power and an optical connection 237 for data) with the RF communications unit 240; noting that a wired connection could alternatively be provided. The measurement unit 210 can be physically attached to the RF communications unit 240. A wireless connection between the measurement unit 210 and the RF communications unit 240 is provided (via an inductive connection 245 for power and an optical connection 247 for data). Again, a wired connection could alternatively be provided.

The arrangement of FIG. 9 has the advantage that the measurement unit 210 can be directly attached to the base unit 230 (i.e. the RF communications unit 240 could be omitted from the stack). This allows a traditional tool setting functionality to be provided (i.e. without an RF interface) but allows an RF communications unit 240 to be added to the system if desired (i.e. by sandwiching it between the measurement unit 210 and the base unit 230).

Although the above examples illustrate non-contact tool setting apparatus, the RF communications module could be included with any measurement apparatus that can be mounted inside a machine tool enclosure.

Figure 10:
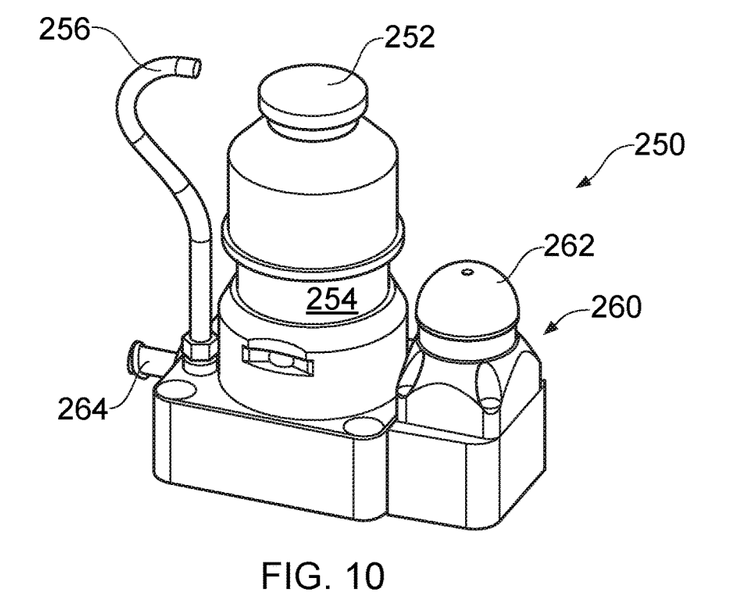
FIG. 10 shows an embodiment in which the device comprises a contact tool setter.

FIG. 10 shows a hard-wired contact tool-setting device 250. The device 250 comprises a stylus disk 252 that is deflectable relative to a probe housing 254. A deflection sensor within the probe housing 254 issues a trigger signal when the stylus disk is deflected away from its neutral position (i.e. when a tool tip makes contact with the disk 252). An optional air blast nozzle 256 is also provided to clear cutting debris from the disk 252. The device 250 also comprises a RF communications module 260 having a dome structure 262 that houses a RF antenna. A RF modem is also provided within the device 250. The probe and the RF communications module 260 are both hard-wired to an external interface via a multi-core electrical cable 264. Although a unitary device is shown, the arrangement could be modular (e.g. the RF communications module 260 could be releasably attachable to the rest of the device).

Figure 11:
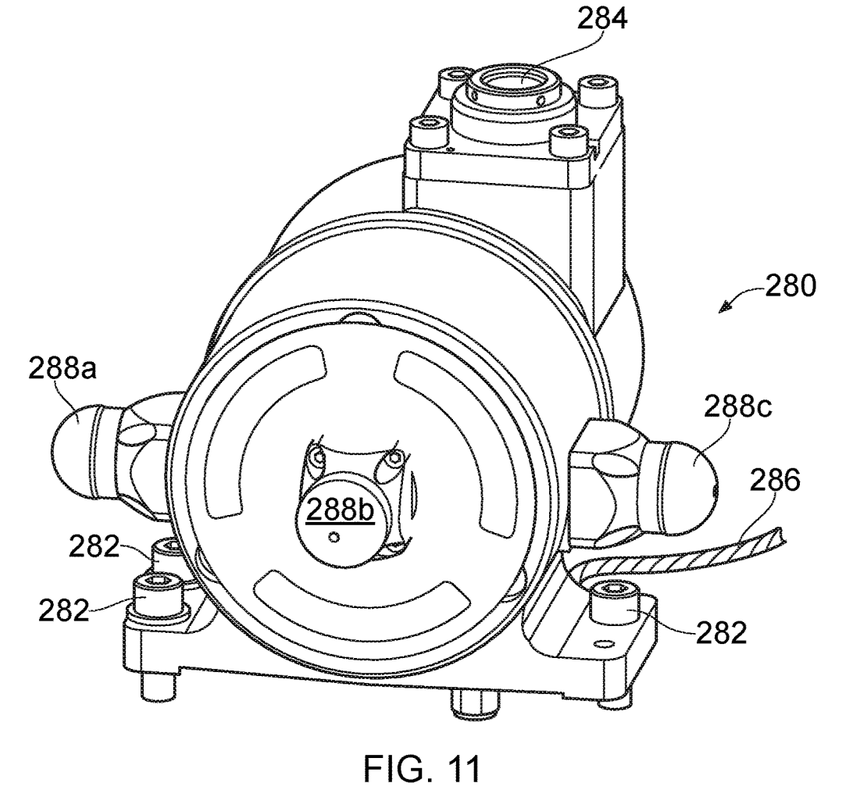
FIG. 11 shows an embodiment in which the hard-wired measurement device comprises an arm for carrying a measurement probe.

FIG. 11 illustrates a hard-wired tool-setting arm mechanism 280 for carrying a measurement probe. The device 280 can attached to an internal wall of the machine tool enclosure via bolts 282 and has an attachment plate 284 to which a measurement probe can be mounted on the end of an elongate arm. Motors within the mechanism 280 rotate the attachment plate 284 and allow an attached measurement probe to be moved into and out of the working volume of the machine tool as required. Power and measurement signals from an attached measured probe are routed through the mechanism 280 to an external interface via a cable 286. Motor control signals are also passed along the same cable 286. The mechanism 280 is illustrated with three RF-transparent dome structures 288a-288c (collectively referred to as dome structures 288). It is envisaged that the mechanism 280 will typically only include one of these dome structures 288, in the most appropriate location for the installation. Multiple dome structures 288 could however be provided. An RF antenna is provided inside one or each dome structure 288 and the RF antennas are each connected to an RF modem. The RF modem is also interfaced to an external interface via the cable 286.

The above are merely examples of the present invention and many alternative options would be immediately apparent to a person skilled in the art on reading the present disclosure. For example, an optical communications module could be used instead of the RF communications module that is described above.

The invention claimed is:

1. A hard-wired measurement device for mounting within an enclosure of a machine tool, comprising;
   a measurement sensor for measuring objects within the machine tool enclosure,
   a hard-wired interface module for providing an electrical connection via one or more wires with an associated external interface located outside of the machine tool enclosure, and
   a wireless communications module enabling wireless communication with an associated wireless device located within the machine tool enclosure,
   wherein the hard-wired measurement device comprises a housing containing the measurement sensor, the hard-wired interface module and the wireless communications module, the housing being mountable within the enclosure of a machine tool.

2. A device according to claim 1, wherein the housing is a unitary housing.

3. A device according to claim 1, wherein the housing is formed from a plurality of releasably attachable housing portions.

4. A device according to claim 3, comprising a first housing portion that comprises the measurement sensor.

5. A device according to claim 3, comprising a second housing portion that comprises at least part of the wireless communications module.

6. A device according to claim 3, comprising a third housing portion that comprises the hard-wired interface module connectable to one or more wires.

7. A device according to any one of claim 3, wherein at least one of the plurality of housing portions comprises a base that is configured for attachment to the enclosure of the machine tool.

8. A device according to claim 1, wherein the measurement sensor is configured to measure a cutting tool carried by the associated machine tool.

9. A device according to claim 1, wherein the hard-wired interface module receives electrical power from the associated external interface via the one or more wires and at least one output derived from the measurement sensor is passed from the hard-wired interface module to the associated external interface via the one or more wires.

10. A device according to claim 1, wherein the hard-wired interface module also interfaces the wireless communications module with the associated external interface.

11. A device according to claim 1, wherein the hard-wired interface module comprises a first electrical connector that enables an electrical connection to be established with a second electrical connector that is connected to the one or more wires.

12. A device according to claim 1, wherein the wireless communications module operates at a radio-frequency (RF).

13. A device according to claim 12, comprising a housing having at least one RF-transparent portion, the wireless communications module comprising an RF antenna located adjacent the at least one RF-transparent portion.

14. A device according to claim 12, wherein the at least one RF-transparent portion comprises at least one dome shaped projection that houses the RF antenna.

15. An apparatus comprising a hard-wired measurement device according to claim 1, a wireless device that can communicate wirelessly with the wireless communications module of the hard-wired measurement device, an external interface and a cable comprising a plurality of wires, the cable connecting the hard-wired interface module of the hard-wired measurement device to the external interface.

16. A machine tool apparatus comprising a machine tool having an enclosure in which a workpiece can be machined and a hard-wired measurement device located within the enclosure, the hard-wired measurement device comprising;
   a measurement sensor for measuring objects within the machine tool enclosure,
   a hard-wired interface module for providing an electrical connection via one or more wires with an external interface located outside of the machine tool enclosure, and
   a wireless communications module enabling wireless communication with an associated wireless device located within the machine tool enclosure.

17. An apparatus according to claim 16, wherein the hard-wired measurement device comprises a housing containing the measurement sensor, the hard-wired interface module and the wireless communications module, the housing being mounted within the enclosure of the machine tool.

18. An apparatus according to claim 17, wherein the machine tool comprises a bed onto which workpieces can be placed, the housing of the hard-wired measurement device being mounted to the bed of the machine tool.

19. An apparatus according to claim 16, wherein the measurement sensor is configured to measure a cutting tool carried by the associated machine tool.

20. An apparatus according to claim 16, further comprising a wireless device located within the machine tool enclosure, the wireless device being configured for wireless communication with the wireless communications module of the hard-wired measurement device.

* * * * *